United States Patent
Yang

(10) Patent No.: US 11,759,709 B2
(45) Date of Patent: Sep. 19, 2023

(54) DISPLAY METHOD AND APPARATUS FOR VIRTUAL ENVIRONMENT PICTURE, AND DEVICE AND STORAGE MEDIUM

(71) Applicant: Tencent Technology (Shenzhen) Company Limited, Guangdong (CN)

(72) Inventor: Jinhao Yang, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 17/701,259

(22) Filed: Mar. 22, 2022

(65) Prior Publication Data

US 2022/0212104 A1    Jul. 7, 2022

Related U.S. Application Data

(63) Continuation of application No. PCT/CN2020/128300, filed on Nov. 12, 2020.

(30) Foreign Application Priority Data

Mar. 18, 2020   (CN) .......................... 202010191816.2

(51) Int. Cl.
  *A63F 13/525*   (2014.01)
  *A63F 13/53*   (2014.01)

(52) U.S. Cl.
  CPC ............ *A63F 13/525* (2014.09); *A63F 13/53* (2014.09); *A63F 2300/8076* (2013.01)

(58) Field of Classification Search
  CPC . A63F 13/525; A63F 13/53; A63F 2300/8076
  (Continued)

(56) References Cited

U.S. PATENT DOCUMENTS 7,614,954 B2    11/2009   Okazaki et al.
9,327,191 B2 *   5/2016   Miyamoto ............ A63F 13/335
(Continued)

FOREIGN PATENT DOCUMENTS

CN        1713938 A    12/2005
CN      101251925 A     8/2008
(Continued)

OTHER PUBLICATIONS

Extended European Search Report for priority application No. PCT/CN2020/128300 dated Oct. 28, 2022, 10p.
(Continued)

*Primary Examiner* — Allen Chan
(74) *Attorney, Agent, or Firm* — Crowell & Moring LLP

(57) ABSTRACT

Embodiments of this disclosure disclose a method and apparatus for displaying a virtual environment picture, a device, and a storage medium, and belong to the computer field. The method includes: creating a first virtual camera and a second virtual camera; performing parameter initialization on the first virtual camera based on device information, to adjust a proportion of the target virtual object in a virtual environment picture; performing parameter initialization on the second virtual camera; and displaying the virtual environment picture based on pictures acquired by the first virtual camera and the second virtual camera. This method can adapt the target virtual object to a device screen, thereby preventing that the device screen has a ratio different from that of a preset virtual environment picture from causing incomplete display of the target virtual object or an obscured central field of view.

20 Claims, 10 Drawing Sheets

(58) Field of Classification Search
USPC .......................................................... 463/31
See application file for complete search history.

(56) References Cited

U.S. PATENT DOCUMENTS

| | | | |
|---|---|---|---|
| 9,345,958 B2 | 5/2016 | Yoshimitsu | |
| 9,433,860 B2 | 9/2016 | Shikata | |
| 10,029,180 B2* | 7/2018 | Yamagami | A63F 13/56 |
| 10,176,641 B2* | 1/2019 | Lindsay | G06T 7/60 |
| 10,434,402 B2 | 10/2019 | Miayamoto | |
| 10,928,975 B2* | 2/2021 | Wang | G06F 1/1694 |
| 11,285,387 B2* | 3/2022 | Iwata | A63F 13/5255 |
| 2006/0040738 A1 | 2/2006 | Okazaki et al. | |
| 2006/0282084 A1 | 12/2006 | Blier et al. | |
| 2012/0094773 A1* | 4/2012 | Suzuki | A63F 13/79 |
| | | | 463/43 |
| 2019/0250699 A1 | 8/2019 | Mulase et al. | |

FOREIGN PATENT DOCUMENTS

| | | |
|---|---|---|
| CN | 107320957 A | 11/2017 |
| CN | 109445103 A | 3/2019 |
| CN | 109550247 A | 4/2019 |
| CN | 110064192 A | 7/2019 |
| CN | 110865812 A | 3/2020 |
| CN | 111420402 A | 7/2020 |
| JP | 2006-155442 A | 6/2006 |
| JP | 2006-263122 A | 10/2006 |
| JP | 2012-075482 A | 4/2012 |
| JP | 2013-226276 A | 11/2013 |
| JP | 2016-077462 A | 5/2016 |
| JP | 2018-057463 A | 4/2018 |
| WO | WO 2021/184785 A1 | 9/2021 |

OTHER PUBLICATIONS

Unity Technologies, "Unity—Manual: Camera", Version 2019.1 dated Aug. 19, 2019, found at https://docs.unity3d.com/2019.1/Documentation/Manual/class-Camera.html, retrieved from the internet on Oct. 19, 2022, 8p. See also https://web.archive.org/web/20220701030355/https://docs.unity3d.com/2019.1/Documentation/Manual/class-Camera.html.

Anonymous, "Draw orthographic visuals (e.g. health bar) in perspective scene?", Apr. 15, 2017, found at https://answers.unity.com/questions/187543/draw-orthographic-visuals-eg-health-bar-in-perspect.html, retrieved from the internet on Oct. 21, 2022, 7p. Archived page at : https://web.archive.org/web/20221221130700/https://answers.unity.com/questions/187543/draw-orthographic-visuals-eg-health-bar-in-perspect.html.

First Office Action for Chinese application No. 202010191816.2 dated Mar. 10, 2021, 3p, in Chinese language.

Search Report for Chinese application No. 202010191816.2 dated Mar. 4, 2021, 2p, in Chinese language.

International Search Report and Written Opinion for priority application No. PCT/CN2020/128300 dated Feb. 4, 2021, 11p, in Chinese language.

English translation of International Search Report for priority application No. PCT/CN2020/128300 dated Feb. 4, 2021, 2p.

Concise Explanation of Relevance for A15, A16 and A17.

Notification of Reasons for Refusal for corresponding Japanese application No. JP 2022-524029 dated Apr. 13, 2023, 3p, in Japanese language.

English language translation of Notification of Reasons for Refusal for corresponding Japanese application No. JP 2022-524029 dated Apr. 13, 2023, 5p.

* cited by examiner

Adjust a first field of view

DISPLAY METHOD AND APPARATUS FOR VIRTUAL ENVIRONMENT PICTURE, AND DEVICE AND STORAGE MEDIUM

RELATED APPLICATION

This application is a continuation application of International Application No. PCT/CN2020/128300, filed Nov. 12, 2020, which claims priority to Chinese Patent Application No. 202010191816.2, entitled "METHOD AND APPARATUS FOR DISPLAYING VIRTUAL ENVIRONMENT PICTURE, DEVICE, AND STORAGE MEDIUM" filed on Mar. 18, 2020. Both of the applications above are incorporated herein by reference in their entireties.

TECHNICAL FIELD

Embodiments of this disclosure relate to the field of computer technologies, and in particular, to a method and apparatus for displaying a virtual environment picture, a device, and a storage medium.

BACKGROUND

In an application based on a three-dimensional virtual environment such as a first-person shooting game, a user may control a virtual object in the virtual environment to perform actions such as walking, running, climbing, shooting, and fighting, and a plurality of users may form a team online to collaboratively complete a task in the same virtual environment.

In the related art, the virtual object may be equipped with a virtual prop (for example, a gun). The user controls the virtual object to attack another virtual object by using the virtual prop. The computer device superimposes and displays the virtual object and the virtual environment at a specific ratio by using a virtual camera in the first-person shooting game, and the user controls the virtual object to perform an operation based on a picture displayed on the device.

However, the method for displaying a virtual environment picture in the related art is merely applicable to a device of which a screen resolution ratio matches a display picture of an application. When displaying the virtual object holding the virtual prop, a device of which a screen resolution ratio is quite different from a preset ratio of the display picture of the application is likely to cause distortion or an abnormal position of the virtual prop, resulting in partially obscured field of view of the virtual object.

SUMMARY

Embodiments of this disclosure provide a method and apparatus for displaying a virtual environment picture, a device, and a storage medium, to adapt a proportion of a virtual object in a virtual environment picture to a screen aspect ratio of a current device, thereby preventing a virtual object from obscuring a central field of view. The technical solutions are as follows:

According to one aspect, an embodiment of this disclosure provides a method for displaying a virtual environment picture, including:

creating a first virtual camera and a second virtual camera, the first virtual camera being configured to perform picture acquisition of a target virtual object from the target virtual object in a virtual environment, the second virtual camera being configured to perform picture acquisition of a virtual object other than the target virtual object from the target virtual object in the virtual environment, and the target virtual object including a first-person virtual object and a virtual prop used by the first-person virtual object;

performing parameter initialization on the first virtual camera based on device information of the computer device, to adjust a proportion of the target virtual object in a virtual environment picture;

performing parameter initialization on the second virtual camera; and displaying the virtual environment picture based on pictures acquired by the first virtual camera and the second virtual camera.

According to another aspect, an embodiment of this disclosure provides an apparatus for displaying a virtual environment picture, including:

a camera creation module, configured to create a first virtual camera and a second virtual camera, the first virtual camera being configured to perform picture acquisition on a target virtual object in a virtual environment, and the second virtual camera being configured to perform picture acquisition on a virtual object in the virtual environment other than the target virtual object, the target virtual object including a first-person virtual object and a virtual prop used by the first-person virtual object;

a first initialization module, configured to perform parameter initialization on the first virtual camera based on device information, to adjust a proportion of the target virtual object in a virtual environment picture;

a second initialization module, configured to perform parameter initialization on the second virtual camera; and a display module, configured to display the virtual environment picture based on pictures acquired by the first virtual camera and the second virtual camera.

According to another aspect, an embodiment of this disclosure provides a computer device, including a processor and a memory, the memory storing at least one instruction, at least one program, a code set, or an instruction set, the at least one instruction, the at least one program, the code set, or the instruction set being loaded and executed by the processor to implement the method for displaying a virtual environment picture described in the foregoing aspect.

According to another aspect, a non-transitory computer-readable storage medium is provided, the computer-readable storage medium storing at least one instruction, at least one program, a code set, or an instruction set, the at least one instruction, the at least one program, the code set, or the instruction set being loaded and executed by a processor to implement the method for displaying a virtual environment picture described in the foregoing aspect.

According to another aspect, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the method for displaying a virtual environment picture provided in the various optional implementations in the foregoing aspects.

The technical solutions provided in the embodiments of this disclosure include at least the following beneficial effects:

In the embodiments of this disclosure, a first virtual camera and a second virtual camera are created to respectively perform picture acquisition on a target virtual object and a virtual object in the virtual environment other than the target virtual object, and parameter initialization is performed on the two virtual cameras based on device information, to adapt a proportion of the target virtual object in a virtual environment picture to a current device screen, thereby preventing that the device screen has a ratio different from that of a preset virtual environment picture from causing a distorted target virtual object, incomplete display, or an obscured central field of view, and normally displaying the virtual environment picture on different types of computer devices.

DESCRIPTION OF EMBODIMENTS

Figure 1:
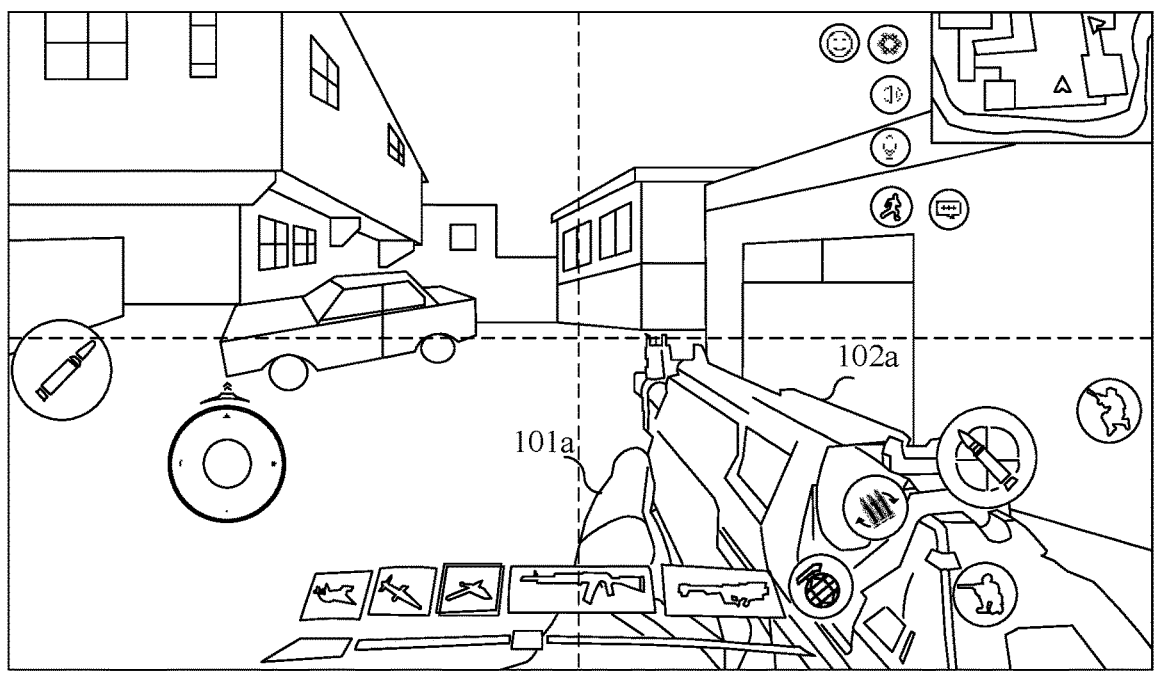
FIG. 1 shows a virtual environment picture displayed on screens having different pixel aspect ratios in the related art.
Figure 1:
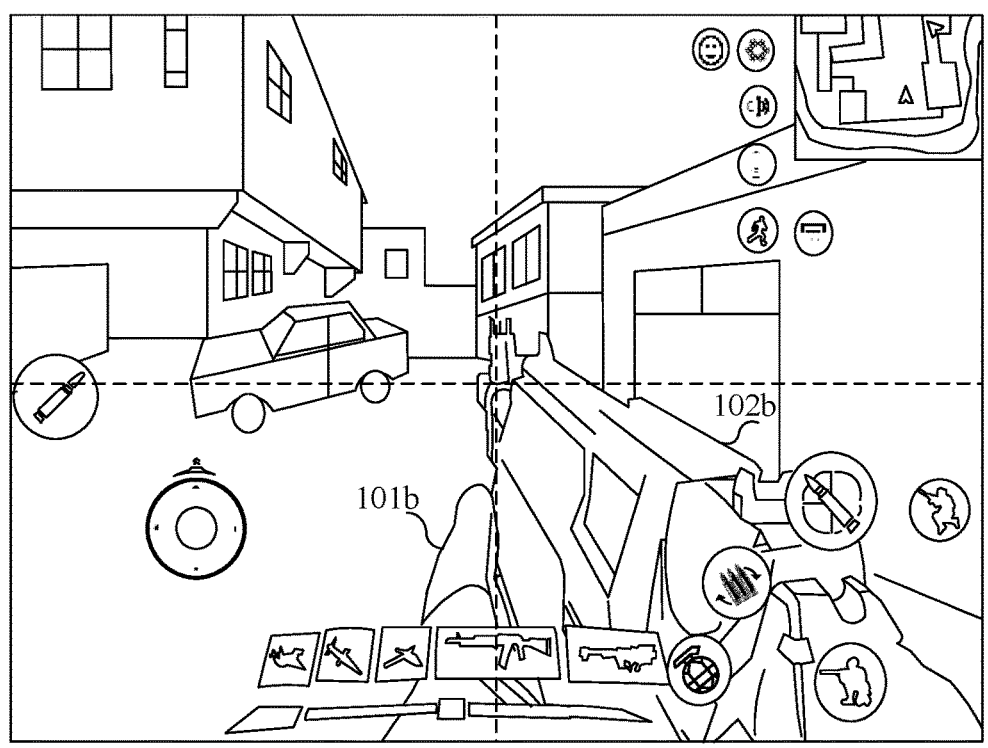

To make objectives, technical solutions, and advantages of this disclosure clearer, implementations of this disclosure are further described below in detail with reference to the accompanying drawings.

"Plurality of" mentioned in this specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects.

First, terms involved in the embodiments of this disclosure are introduced as follows:

Virtual environment: It is a virtual environment displayed (or provided) by an application when run on a computer device. The virtual environment may be a simulated environment of a real world, or may be a semi-simulated semi-fictional environment, or may be a completely fictional environment. The virtual environment may be any one of a two-dimensional virtual environment, a 2.5-dimensional virtual environment, and a three-dimensional virtual environment, which is not limited in this disclosure. A description is made in the following embodiments by using an example in which the virtual environment is a three-dimensional virtual environment.

Virtual object: It is a movable object in the virtual environment. The movable object may be a virtual person, a virtual animal, a cartoon character, or the like, for example, a person, an animal, a plant, an oil drum, a wall, or a stone displayed in a three-dimensional virtual environment. Exemplary, the virtual object is a three-dimensional model created based on a skeletal animation technology. Each virtual object has a respective shape and size in the three-dimensional virtual environment, and occupies some space in the three-dimensional virtual environment.

Virtual prop: It is a prop that can be used by a virtual object in a virtual environment, including a virtual weapon, such as a pistol, a rifle, a sniper rifle, a dagger, a knife, a sword, or an axe, that can cause damage to another virtual object, a supply prop such as bullets, a defensive prop such as a shield, an armor, or an armored vehicle.

First-person shooting game: It is a shooting game in which a user can play in a first-person perspective. A virtual environment picture in the game is a picture of a virtual environment observed from a perspective of a first virtual object. In the game, at least two virtual objects play in a single-round battle mode in the virtual environment. The virtual object eludes damage caused by another virtual object and dangers (for example, a poison gas area and a swamp) in the virtual environment to survive in the virtual environment. When a hit point of the virtual object in the virtual environment is zero, the life of the virtual object in the virtual environment ends, and the final virtual object surviving in the virtual environment wins. Exemplary, the battle starts with a moment when the first client joins the battle and ends with a moment when the last client exits the battle. Each client may control one or more virtual objects in the virtual environment. Exemplary, arena modes of the battle may include a single-player battle mode, a two-player team battle mode, or a multi-player team battle mode. The battle mode is not limited in the embodiments of this disclosure.

User interface (UI) control: It is any visual control or element that can be seen on a UI of an application, for example, a control such as a picture, an input box, a text box, a button, or a label. Some UI controls respond to operations of a user.

In this disclosure, when a virtual prop is "equipped, carried, or assembled", it means that a virtual object owns the virtual prop, or a virtual object owns an inventory with an inventory slot and the virtual prop is stored in the inventory of the virtual object, or a virtual object is using the virtual prop.

The method provided in this disclosure may be applied to a virtual reality application, a three-dimensional map program, a military simulation program, a first-person shooting game, a multiplayer online battle arena game (MOBA), or the like. An application in the first-person shooting game is used as an example for describing the following embodiments.

For example, a game based on a virtual world includes maps of one or more game worlds. The virtual world in the game simulates scenes in the real world. A user may control a virtual character in the game to perform actions in the virtual world such as walking, running, jumping, shooting, fighting, driving, using a virtual weapon to attack another virtual character, and using a virtual weapon to accumulate force to attack another virtual character, which has relatively high interactivity. In addition, a plurality of users may team up online to play an arena game.

In the related art, in the first-person shooting game, images of all virtual objects are acquired by a virtual camera and then are displayed. For computer devices having different pixel aspect ratios, the virtual camera is initialized by using a default field of view. FIG. 1 shows a schematic diagram of a virtual environment picture in the related art. An upper part of the figure shows a virtual environment picture displayed on a screen with a pixel aspect ratio of 16:9. A first-person virtual character 101*a* and a virtual prop 102*a* used by the first-person virtual character 101*a* are displayed on a bottom right part of the screen without exceeding screen center lines in a height direction and a width direction, and have an appropriate picture proportion. A lower part of the figure shows a virtual environment picture displayed on a screen with a pixel aspect ratio of 4:3. It can be clearly seen that a first-person virtual character 101*b* and a virtual prop 102*b* used by the first-person virtual character 101*b* have an obviously greater proportion in the screen, exceed the screen center lines both in the height direction and the width direction, and partially obscure the field of view of the first-person virtual character 101*b*, and a part of the virtual prop 102*b* in a bottom right corner cannot be displayed.

Figure 2:
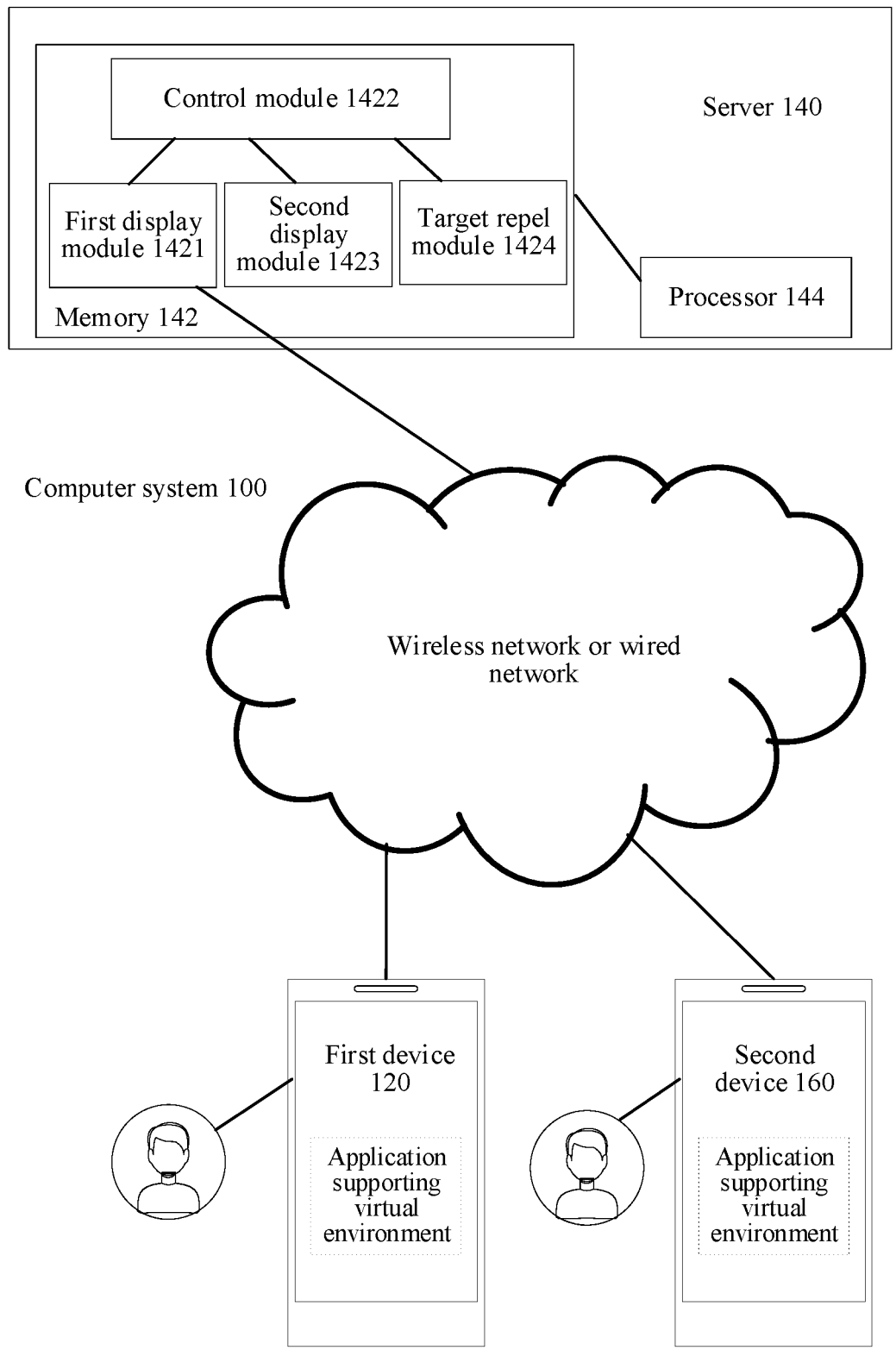
FIG. 2 is a schematic diagram of an implementation environment according to an exemplary embodiment of this disclosure.

FIG. 2 is a schematic diagram of an implementation environment according to an exemplary embodiment of this disclosure. The implementation environment includes: a first device 120, a server 140, and a second device 160.

An application supporting a virtual environment is installed and run on the first device 120. The application may be any one of a VR application, a three-dimensional map program, a military simulation program, a first-person shooting (FPS) game, a MOBA game, or a multiplayer shooting survival game. The first device 120 is a device used by a first user. The first user uses the first device 120 to control a first virtual object in a virtual environment to perform motions. The motions include, but are not limited to, at least one of body posture adjustment, crawling, walking, running, cycling, jumping, driving, shooting, throwing, switching a virtual prop, or using the virtual prop to attack another virtual object. For example, the first virtual object is a first virtual person such as a simulated character object or a cartoon character object.

The first device 120 is connected to the server 140 by using a wireless network or a wired network.

The server 140 includes at least one of one server, a plurality of servers, a cloud computing platform, or a virtualization center. For example, the server 140 includes a processor 144 and a memory 142. The memory 142 includes a first display module 1421, a control module 1422, a second display module 1423, and a target repel module 1424. The server 140 is configured to provide a backend service for an application supporting the three-dimensional virtual environment. Exemplary, the server 140 is responsible for primary computing work, and the first device 120 and the second device 160 are responsible for secondary computing work. Alternatively, the server 140 is responsible for secondary computing work, and the first device 120 and the second device 160 are responsible for primary computing work. Alternatively, collaborative computing is performed by using a distributed computing architecture among the server 140, the first device 120, and the second device 160.

An application supporting a virtual environment is installed and run on the second device 160. The application may be any one of a virtual reality application, a three-dimensional map application, a military simulation application, an FPS game, a MOBA game, or a multiplayer shooting survival game. The second device 160 is a device used by a second user. The second user uses the second device 160 to control a second virtual object in a virtual environment to perform motions. The motions include, but are not limited to, at least one of body posture adjustment, crawling, walking, running, cycling, jumping, driving, shooting, throwing, switching a virtual prop, or using the virtual prop to attack another virtual object. For example, the second virtual object is a second virtual person, such as a simulated character object or a cartoon character object.

Exemplary, the first virtual person and the second virtual person are located in the same virtual environment. Exemplary, the first virtual person and the second virtual person may belong to the same team or the same organization, have a friend relationship, or have a temporary communication permission.

Exemplary, the applications installed on the first device 120 and the second device 160 are the same, or the applications installed on the two devices are the same type of applications of different control system platforms. The first device 120 may generally refer to one of a plurality of devices, and the second device 160 may generally refer to one of a plurality of devices. In this embodiment, only the first device 120 and the second device 160 are used as an example for description. The first device 120 and the second device 160 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop computer, or a desktop computer. The following embodiments are described by using an example in which the device includes a smartphone.

A person skilled in the art may learn that there may be more or fewer devices. For example, there may be only one device, or there may be dozens of or hundreds of or more devices. The quantity and the device types of the devices are not limited in the embodiments of this disclosure.

The method for displaying a virtual environment picture shown in the embodiments of this disclosure is applicable to a computer device on which a game application is installed. The game application may be a card game, a MOBA game, a role-playing game, a strategy game, a shooting game, or the like. The game applications to which the method for displaying a virtual environment picture is applicable in the embodiments of this disclosure all require to support a virtual environment.

Figure 3:
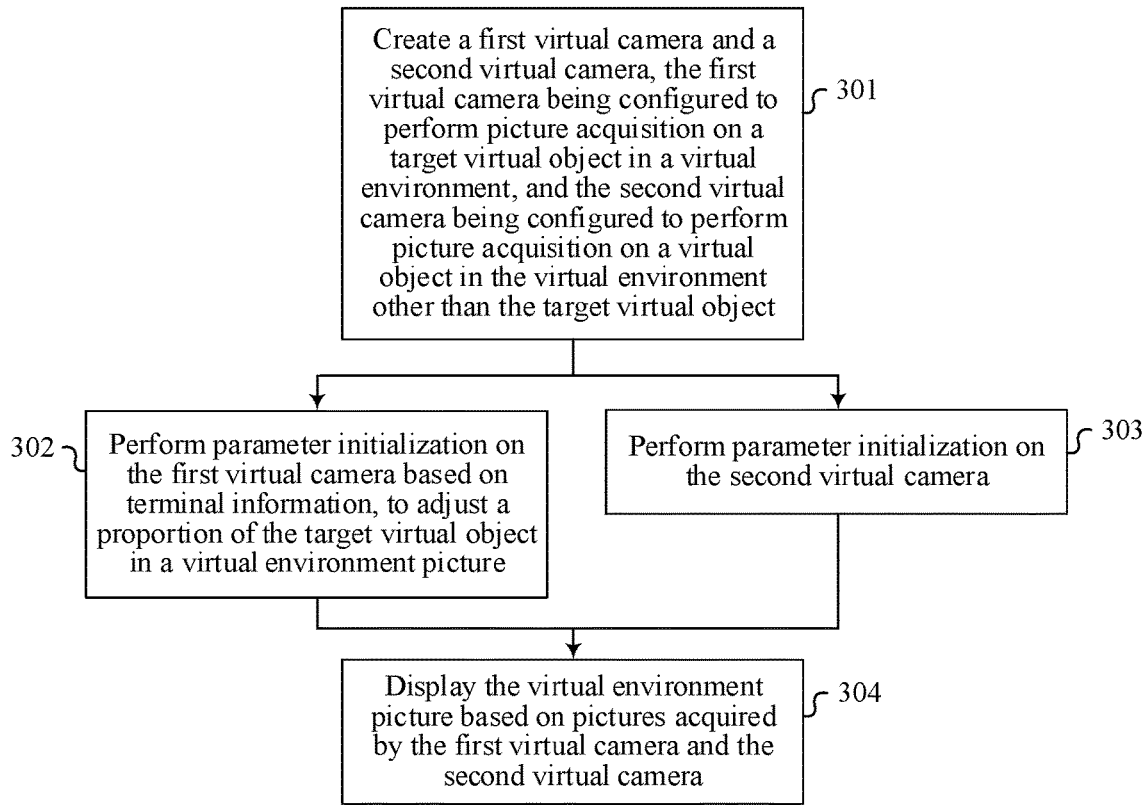
FIG. 3 is a flowchart of a method for displaying a virtual environment picture according to an exemplary embodiment of this disclosure.

FIG. 3 is a flowchart of a method for displaying a virtual environment picture according to an exemplary embodiment of this disclosure. In this embodiment, the description is made by using an example in which the method is applied to a computer device on which an application supporting a virtual environment is installed. The method includes the following steps:

Step 301: Create a first virtual camera and a second virtual camera, the first virtual camera being configured to perform picture acquisition on a target virtual object in a virtual environment, and the second virtual camera being configured to perform picture acquisition on a virtual object in the virtual environment other than the target virtual object.

The target virtual object includes a first-person virtual object and a virtual prop used by the first-person virtual object.

Figure 4:
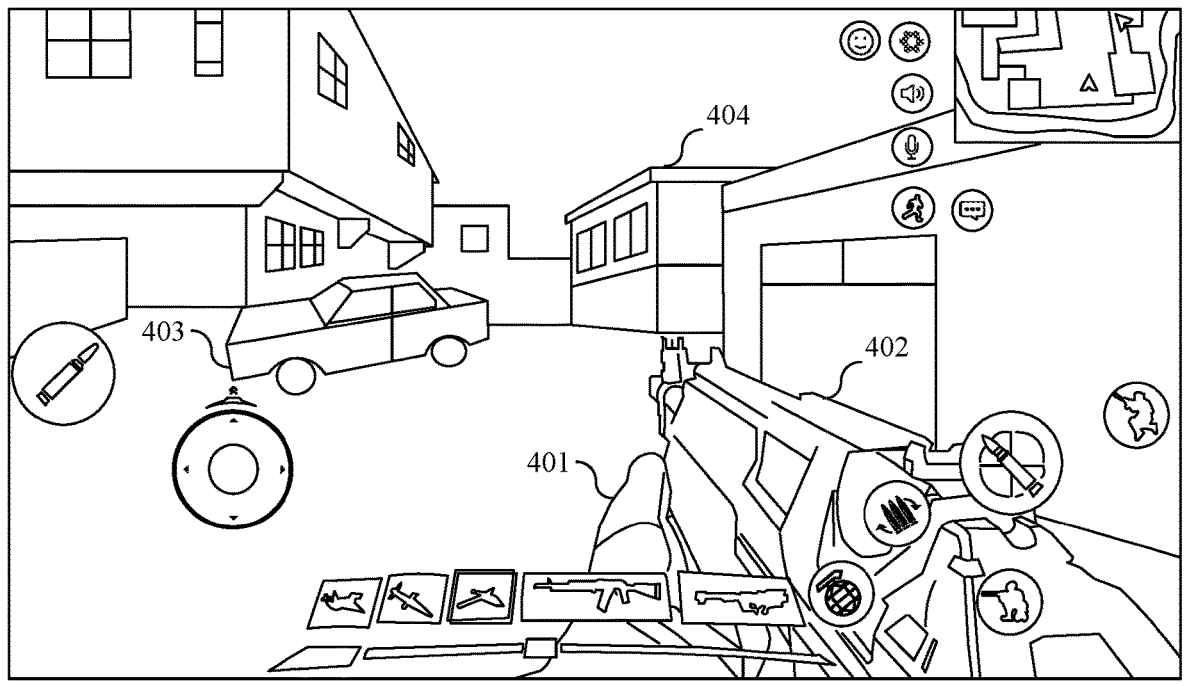
FIG. 4 is a schematic diagram of a virtual environment picture according to an exemplary embodiment of this disclosure.

For example, FIG. 4 shows a schematic diagram of a virtual environment. The target virtual object includes a first-person virtual object 401 (the hands) and a virtual prop 402 used by the first-person virtual object 401. The first virtual camera is used by the computer device to perform picture acquisition on the first-person virtual object 401 and the virtual prop 402. The second virtual camera is used to perform picture acquisition on a virtual object, for example, a car 403 (in which the first-person virtual object 401 does not ride), a house 404, a street, or the sky, in the virtual environment other than the target virtual object.

Exemplary, the virtual environment picture is a picture of observing the virtual environment from a perspective of the virtual object. The perspective refers to an observation angle at which observation is performed in a virtual environment from a first-person perspective of a virtual object or a third-person perspective. Exemplary, in the embodiments of this disclosure, the perspective is an angle at which observation is performed on the virtual object in the virtual environment by using the virtual camera.

Exemplary, the virtual camera automatically follows the target virtual object in the virtual environment. That is, when a position of the target virtual object in the virtual environment changes, a position of the virtual camera following the target virtual object in the virtual environment changes simultaneously, and the virtual camera is always within a preset distance range of the target virtual object in the virtual environment. Exemplary, in the automatic following process, relative positions of the virtual camera and the virtual object remain unchanged.

The virtual camera refers to a three-dimensional model located around a target virtual object in a virtual environment. When the first-person perspective is used, the virtual camera is located near the head of the target virtual object or located at the head of the target virtual object. When the third-person perspective is used, the virtual camera may be located behind the target virtual object and bound to the target virtual object, or may be located at any position away from the target virtual object by a preset distance. The target virtual object in the virtual environment may be observed from different perspectives by using the virtual camera. Exemplary, when the third-person perspective is a first-person over-shoulder perspective, the virtual camera is located behind the target virtual object (for example, the head and the shoulders of the virtual person). Exemplary, in addition to the first-person perspective and the third-person perspective, the perspective also includes other perspectives, such as a top perspective. When the top perspective is used, the virtual camera may be located above the head of the target virtual object. The top perspective is a perspective for observing the virtual environment at an angle from the sky. Exemplary, the virtual camera is not actually displayed in the virtual environment. In other words, the virtual camera is not displayed in the virtual environment displayed in the UI.

Figure 5:
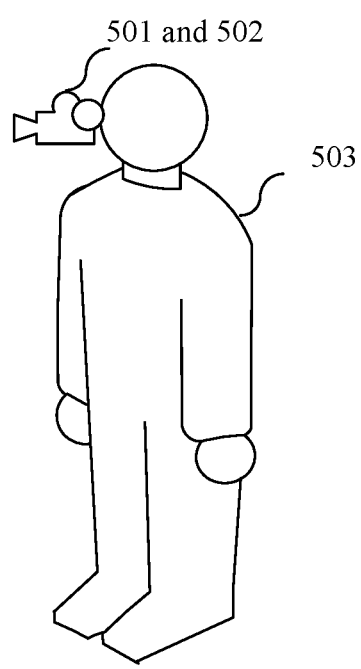
FIG. 5 is a schematic diagram of positions of a first virtual camera and a second virtual camera according to an exemplary embodiment of this disclosure.

In an exemplary implementation, the description is made by using an example in which the virtual camera is located at the head of the first-person virtual object. One first-person virtual object corresponds to two virtual cameras, including the first virtual camera and the second virtual camera, to respectively acquire images of different virtual objects. Positions of the first virtual camera and the second virtual camera in the virtual environment are the same. As shown in FIG. 5, a first virtual camera 501 and a second virtual camera 502 are bound to each other and located at a position where eyes of a first-person virtual character 503 are located, and the first virtual camera 501 and the second virtual camera 502 synchronously move and rotate along with the first-person virtual character.

Exemplary, the virtual camera may alternatively observe the target virtual object at a preset angle in different directions of the target virtual object.

Exemplary, the virtual environment displayed on the virtual environment picture includes at least one of the following elements: a mountain, a plain, a river, a lake, a sea, a desert, sky, a plant, a building, or a vehicle.

Step 302: Perform parameter initialization on the first virtual camera based on device information, to adjust a proportion of the target virtual object in a virtual environment picture.

Exemplary, the device information includes information such as a device model, a model of a device screen, a resolution of a device screen, or a pixel aspect ratio of a device screen.

A game developer usually designs the virtual environment picture by using a type of a screen having a largest screen ratio on the market as a standard. Therefore, during application, the virtual environment picture may be adapted to a computer device with the type of the screen. For another type of computer device, a proportion of the target virtual object may not be appropriate when the virtual environment picture is displayed. For example, in a case that the proportion is excessively large, a part of the target virtual object cannot be displayed in the virtual environment picture, or a central field of view may be obscured, which degrades the gaming experience of the user. In an exemplary implementation, the computer device performs parameter initialization on the first virtual camera based on current device information, to cause the first virtual camera to acquire pictures of the target virtual object based on an initialized parameter, so that a proportion of the target virtual object in the virtual environment picture is controlled to be adapted to the device screen.

Step 303: Perform parameter initialization on the second virtual camera.

In an exemplary implementation, since the second virtual camera is configured to perform picture acquisition on a virtual object in the virtual environment other than the target virtual object, picture acquisition is generally performed only according to a standard in picture design, and parameter initialization may be performed based on a preset initialized parameter.

Exemplary, the computer device creates, each time receiving an instruction for displaying the virtual environment picture, that is, when the first-person shooting game is started, the first virtual camera and the second virtual camera, and performs parameter initialization on the first virtual camera and the second virtual camera. Alternatively, the computer device performs, when the first-person shooting game is started for the first time, parameter initialization on the first virtual camera and the second virtual camera based on device information and stores an initialized parameter to a game account of the user; directly creates, when the first-person shooting game is started the next time, the first virtual camera and the second virtual camera based on the stored initialized parameter; and re-performs creation and initialization on the virtual camera when the user logs in to the first-person shooting game by using the game account on another computer device.

Step 304: Display the virtual environment picture based on pictures acquired by the first virtual camera and the second virtual camera.

In an exemplary implementation, the computer device superimposes a picture of the target virtual object acquired by the first virtual camera and a picture of the remaining virtual objects acquired by the second virtual camera, to completely display the virtual environment picture.

Based on the above, in the embodiments of this disclosure, a first virtual camera and a second virtual camera are created to respectively perform picture acquisition on a target virtual object and a virtual object in the virtual environment other than the target virtual object. Parameter initialization is performed on the two virtual cameras based on device information, to adapt a proportion of the target virtual object in a virtual environment picture to a screen of a current computer device. Thereby, preventing that the screen of the computer device has a ratio different from that of a preset virtual environment picture from causing a distorted target virtual object, incomplete display, or an obscured central field of view, and normally displaying the virtual environment picture on different types of computer devices.

A root cause that affects a display ratio of the virtual environment picture is a screen pixel aspect ratio. In an exemplary implementation, the device information is a pixel aspect ratio of the computer device screen, and the computer device determines the first field of view of the first virtual camera based on the pixel aspect ratio.

Figure 6:
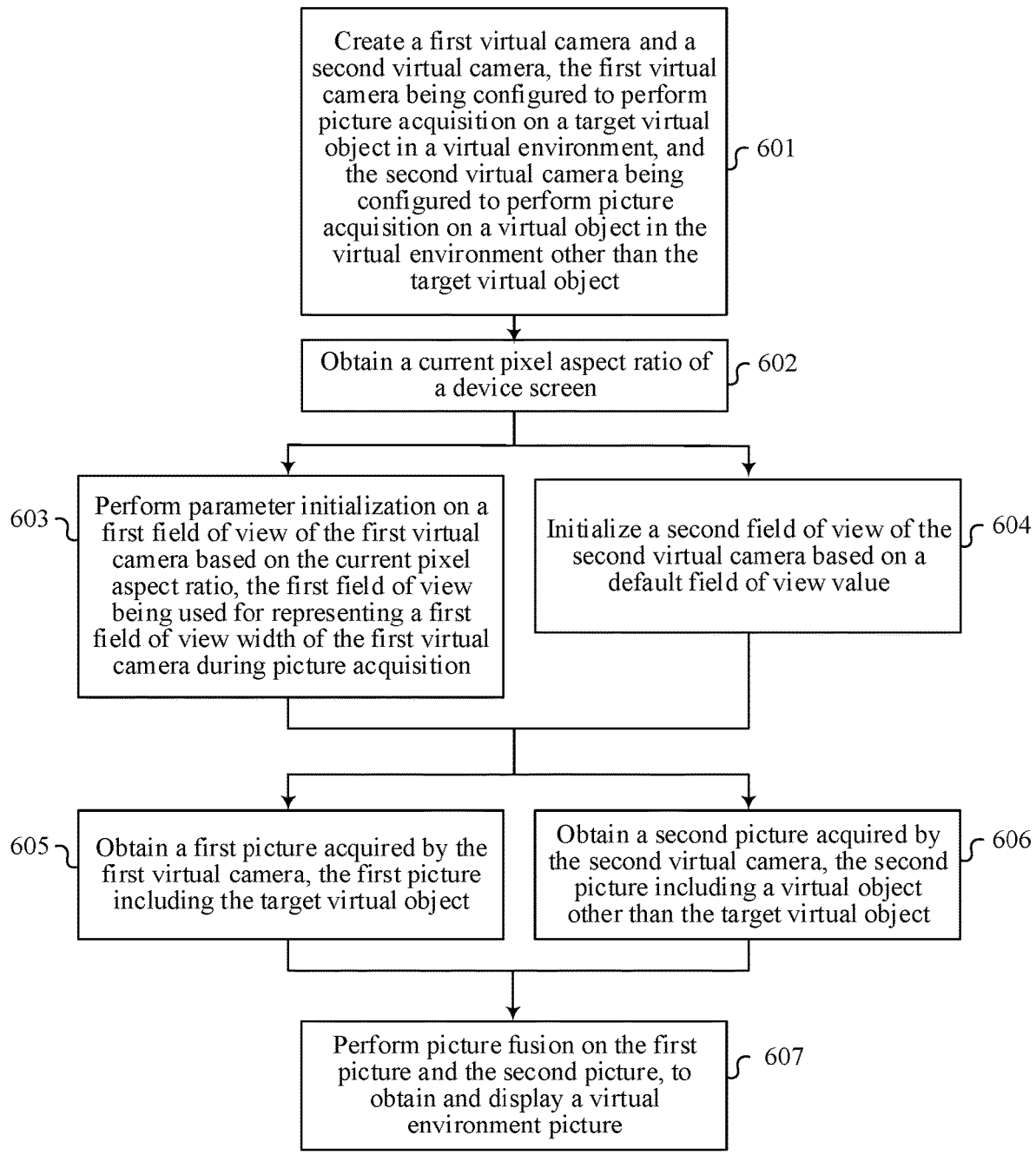
FIG. 6 is a flowchart of a method for displaying a virtual environment picture according to another exemplary embodiment of this disclosure.

FIG. 6 is a flowchart of a method for displaying a virtual environment picture according to another exemplary embodiment of this disclosure. In this embodiment, the description is made by using an example in which the method is applied to a computer device on which an application supporting a virtual environment is installed. The method includes the following steps:

Step 601: Create a first virtual camera and a second virtual camera, the first virtual camera being configured to perform picture acquisition on a target virtual object in a virtual environment, and the second virtual camera being configured to perform picture acquisition on a virtual object in the virtual environment other than the target virtual object.

For the implementation of step 601, reference may be made to step 301, and details are not described again in this embodiment of this disclosure.

Step 602: Obtain a current pixel aspect ratio of a computer device screen.

In an exemplary implementation, the computer device obtains the current pixel aspect ratio according to a screen resolution in current device information. The screen resolution refers to quantities of pixels in vertical and horizontal directions such as 1600×1200 px, 1280×720 px, or 1280×1024 px, and corresponding pixel aspect ratios are respectively 4:3, 16:9, and 5:4. Since a screen display region of some computer devices is changeable, a current pixel aspect ratio of the screen display region may also change. For example, the screen pixel aspect ratio may change when the first-person shooting game is run on a computer device having a special-shaped screen, and the pixel aspect ratio a computer device having a folded screen may also be different in folded and unfolded states. Therefore, the computer device needs to obtain the current pixel aspect ratio to ensure that the target virtual object is adapted to a screen in a current state.

Alternatively, the computer device obtains the current pixel aspect ratio according to a current screen display state. For example, the computer device obtains the size of the current screen display region and determines a width and a height of the current screen display region according to a holding state of the user, so as to obtain the current pixel aspect ratio.

The developer usually designs the virtual environment picture by using a screen most commonly used on the market as a standard. According to statistics, currently, the resolution of a most widely used screen is 1920×1080 px. Therefore, the virtual environment picture can be normally displayed on a computer device using such type of the screen, and for a computer device using another type of screen, the virtual environment picture may be adjusted. A statistical table of some screen types is shown in Table 1:

TABLE 1

| Ranking | Screen resolution | Active proportion |
| --- | --- | --- |
| 1 | 1920 × 1080 | 28.9 |
| 2 | 1280 × 720 | 22.5 |
| 3 | 1080 × 1821 | 3.9 |
| 4 | 960 × 540 | 3.3 |
| 5 | 854 × 480 | 2.8 |
| 6 | 720 × 1208 | 2.6 |
| 7 | 1184 × 720 | 2.4 |

Factors that affect the proportion of the target virtual object in the virtual environment picture include an aspect ratio of the computer device screen, and a currently common screen aspect ratio is 16:9. Therefore, for a screen of which an aspect ratio is relatively large or close to 16:9 (for example, 17:9), the proportion of the target virtual object is not excessively large, so that the target virtual object is incompletely displayed or obscures the central field of view. For a screen of which an aspect ratio is relatively small (for example, 4:3), a part of the target virtual object may obscure the central field of view. Therefore, the computer device adjusts a position of the target virtual object based on the current pixel aspect ratio of the screen.

Step 603: Perform parameter initialization on a first field of view of the first virtual camera based on the current pixel aspect ratio, the first field of view being used for representing a first view field width of the first virtual camera during picture acquisition.

The first view field width is in a positive correlation with the first field of view, and the first view field width is in a negative correlation with the proportion of the target virtual object in the virtual environment picture.

In an exemplary implementation, a proportion of the target virtual object in a virtual environment picture may be adjusted by adjusting a view field width of the first virtual camera. A greater view field width indicates a smaller object in the field of view, that is, the target virtual object. Conversely, a smaller view field width indicates a greater target virtual object. The computer device adjusts the view field width by setting the first field of view of the first virtual camera during initialization. The view field width of the virtual camera is determined by a size of the field of view (FOV), and a greater FOV indicates a greater view field width.

In an exemplary implementation, step 603 includes steps 1 to 3 as follows:

Step 1: Obtain a first configuration file, the first configuration file including a correspondence between a candidate pixel aspect ratio and a candidate first field of view value, the candidate first field of view value being in a negative correlation with the candidate pixel aspect ratio.

In an exemplary implementation, the developer adapts the virtual environment picture to different pixel aspect ratios in a game development stage, so that field of view values of the first virtual camera corresponding to the pixel aspect ratios are determined and are summarized into a first configuration file. The first configuration file is simultaneously downloaded when the first-person shooting game is downloaded on the computer device. For example, Table 2 shows some content of the first configuration file:

TABLE 2

| Candidate pixel aspect ratio | Candidate first field of view value |
| --- | --- |
| 1 | 70 |
| 1.33 | 58 |
| 1.4 | 55 |
| 1.77 | 55 |
| 2 | 50 |
| 2.5 | 50 |

Step 2: Determine a target pixel aspect ratio in the first configuration file, a matching degree between the target pixel aspect ratio and the current pixel aspect ratio being higher than a matching degree between another candidate pixel aspect ratios in the configuration file and the current pixel aspect ratio.

For example, the screen resolution of the computer device is 1600×1200 px, that is, the current pixel aspect ratio is 4:3. Therefore, it can be determined that the target pixel aspect ratio of the first configuration file is 1.33.

In the game development process, the developer makes the configuration file include all types of screens on the market as much as possible. However, the pixel aspect ratio corresponding to the screen resolution of the current computer device may be different from all candidate pixel aspect ratios in the first configuration file. In an exemplary implementation, the computer device determines a candidate pixel aspect ratio having the highest matching degree with the current pixel aspect ratio as the target pixel aspect ratio. For example, a current pixel aspect ratio is 1.3, and the computer device determines 1.33 as a target pixel aspect ratio.

Exemplary, the candidate pixel aspect ratio having the highest matching degree with the current pixel aspect ratio refers to a candidate pixel aspect ratio closest to a value of the current pixel aspect ratio in the first configuration file. Alternatively, to ensure that the target virtual object does not obscure the central field of view, the developer determines a candidate pixel aspect ratio of which a value is greater than and closest to the current pixel aspect ratio as a candidate pixel aspect ratio having the highest matching degree. For example, a current pixel aspect ratio is 1.34, the first configuration file is shown in Table 1, and the computer device determines 1.4 as a target pixel aspect ratio.

Step 3: Initialize the first field of view based on the first field of view value corresponding to the target pixel aspect ratio.

For example, the target pixel aspect ratio is 1.33, and the computer device performs initialization based on a first field of view value 58.

In an exemplary implementation, the first configuration file further includes a height coordinate of the first virtual camera, which is used for indicating a position of the first virtual camera in the virtual environment.

Step 604: Initialize a second field of view of the second virtual camera based on a default field of view value.

The second virtual camera is responsible for acquiring a virtual object in the virtual environment picture other than the target virtual object. Therefore, to prevent the virtual environment from being deformed, the second field of view of the second virtual camera is generally initialized based on the default field of view value.

In an exemplary implementation, the developer may use a most widely used screen type (for example, a screen with a pixel aspect ratio of 16:9) as a standard, to set a default field of view value (for example, 55) of the second virtual camera and store the value into the first configuration file.

In an exemplary implementation, positions of the first virtual camera and the second virtual camera in the virtual environment are the same, and the computer device performs initialization on the second virtual camera based on the position coordinates of the first virtual camera in the first configuration file.

Step 605: Obtain a first picture acquired by the first virtual camera, the first picture including the target virtual object.

A first culling mask is set on the first virtual camera, and a second culling mask is set on the second virtual camera. A culling mask layer of the first culling mask is a layer corresponding to the target virtual object, and a culling mask layer of the second culling mask is a layer other than the layer corresponding to the target virtual object.

Figure 7:
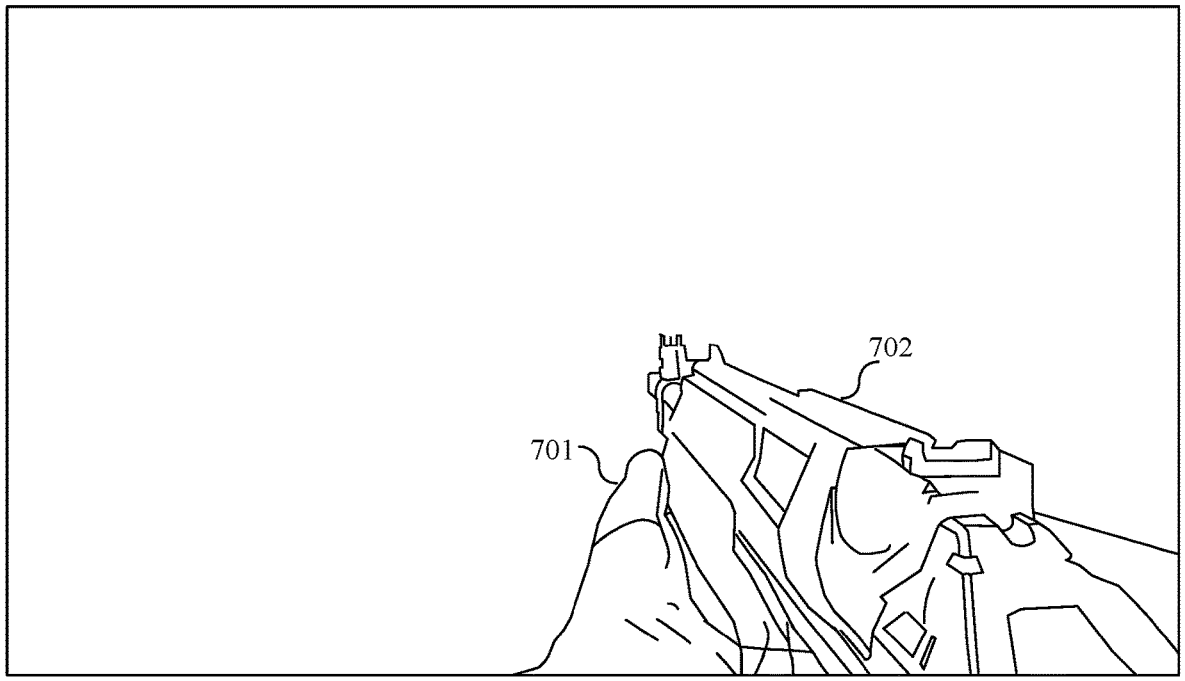
FIG. 7 is a schematic diagram of a first image acquired by a first virtual camera according to an exemplary embodiment of this disclosure.

In an exemplary implementation, the virtual environment picture is formed by superimposing a plurality of layers and displayed, and the first picture acquired by the first virtual camera corresponds to a layer at which the target virtual object is present. As shown in FIG. 7, the first picture corresponding to the culling mask layer of the first virtual camera only includes a first-person virtual object 701 and a virtual prop 702 used by the first-person virtual object 701.

Step 606: Obtain a second picture acquired by the second virtual camera, the second picture including a virtual object other than the target virtual object.

Figure 8:
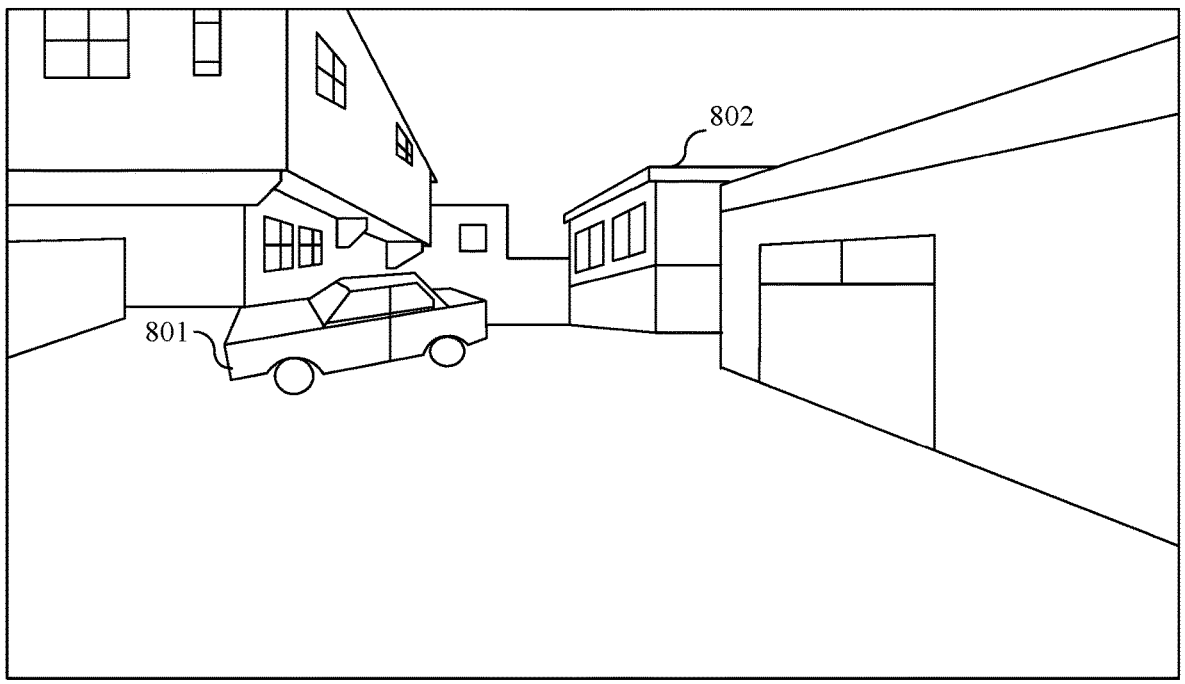
FIG. 8 is a schematic diagram of a second picture acquired by a second virtual camera according to an exemplary embodiment of this disclosure.

The culling mask layer corresponding to the second virtual camera is a layer other than the layer corresponding to the target virtual object, and the second picture acquired by the second virtual camera may be placed at the plurality of layers. For example, virtual environments, such as a house, a street, and a vehicle, may be placed at the same layer. For example, referring to FIG. 8, the second picture corresponding to a second culling mask layer is a picture of a virtual object other than the target virtual object that is acquired by the second virtual camera. The virtual object other than the target virtual object includes a vehicle 801, a house 802, a street, the sky, and the like.

Step 607: Perform picture fusion on the first picture and the second picture, to obtain and display the virtual environment picture.

The computer device fuses a layer at which the first picture is present and a layer at which the second picture is present, to finally obtain the virtual environment picture in which the target virtual object is adapted to the current screen.

Figure 9:
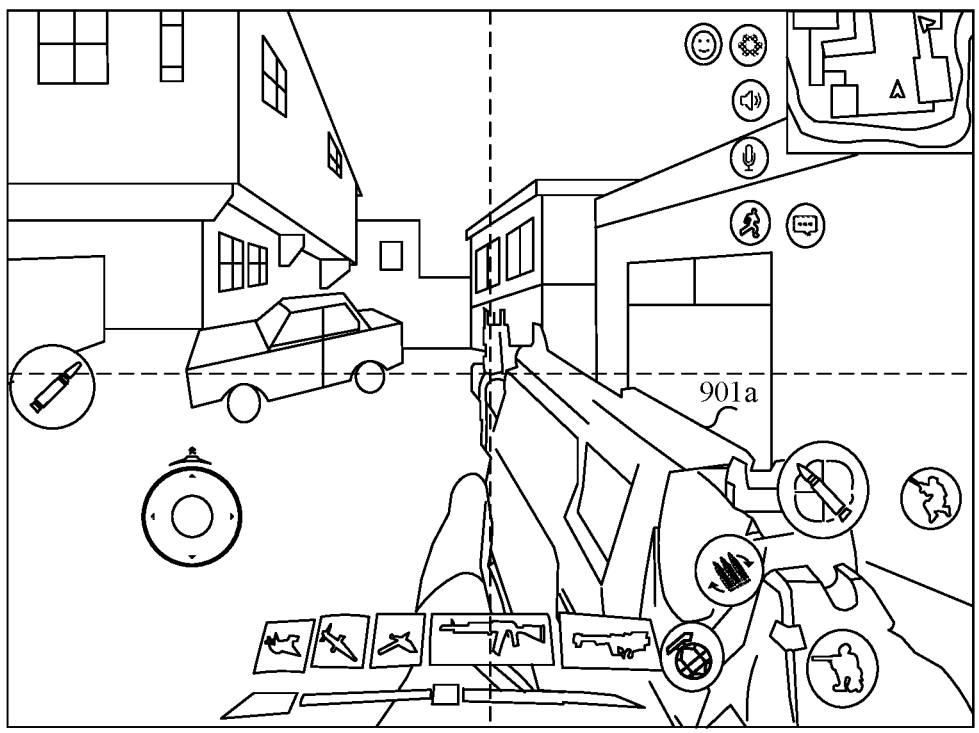
FIG. 9 is a schematic diagram of virtual environment pictures before and after adjustment of a first field of view according to an exemplary embodiment of this disclosure.
Figure 9:
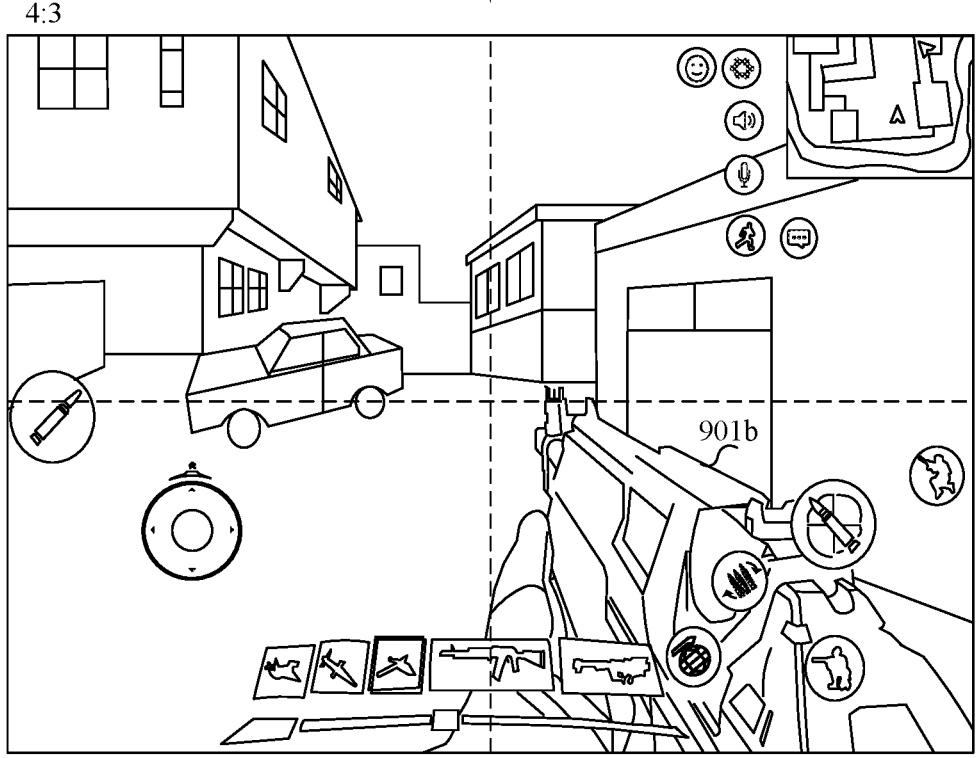

For example, FIG. 9 is a schematic diagram of a virtual environment picture. An upper part of the figure shows a virtual environment picture displayed by the computer device when the method for displaying a virtual environment picture is not adopted. The pixel aspect ratio of the computer device is 4:3. A target virtual object 901*a* accounts for a larger proportion of the virtual environment picture. Consequently, a part of the target virtual object 901*a* close to a bottom edge of the screen cannot be displayed, and the target virtual object 901*a* exceeds screen center lines in both a height direction and a width direction, obscuring a part of the central field of view. A lower part of the figure shows a virtual environment picture displayed by the computer device when the method for displaying a virtual environment picture is adopted. It can be seen that a target virtual object 901b has a significantly reduced proportion and can be completely displayed without obscuring a field of view at an intersection of the screen center lines.

In an exemplary implementation, the computer device performs the following step 1 and step 2 after displaying the virtual environment picture:

Step 1: Obtain a current first field of view value of the first field of view in a case that the first-person virtual object performs a preset action.

In an exemplary implementation, some actions (for example, putting away the virtual prop, driving a virtual vehicle, or the like) of the first-person virtual object may cause the first field of view value to change, or change the first field of view value into the default field of view value the same as the second field of view value. Therefore, the computer device needs to determine whether the first field of view value is changed when detecting an action that may change the first field of view value.

The developer sets the action that may change the first field of view value as a preset action and perform event tracking in advance, and the current first field of view value is obtained when the preset action is detected by the computer device.

Step 2: Update the current first field of view value to the initialized first field of view value in a case that the current first field of view value is different from the initialized first field of view value.

For example, if the pixel aspect ratio of the computer device is 4:3, the initialized first field of view value is 58. When the computer device detects that the first-person virtual object puts away the virtual prop, if the current first field of view value that is obtained is 55, the current first field of view value is updated to 58.

In the embodiments of this disclosure, the first field of view of the first virtual camera is determined based on the current pixel aspect ratio of the computer device screen, and parameter initialization is performed on the first virtual camera based on the first field of view, so that the proportion of the first virtual object in the virtual environment picture is adjusted, to prevent the first virtual object from being incompletely displayed or obscuring the central field of view. Pictures acquired different virtual cameras are placed at different layers, and the virtual environment picture is obtained by performing picture fusion, so that the computer device may easily perform personalized setting on the target virtual object and the virtual object other than the target virtual object respectively, thereby avoiding deformation of one part due to adjustment of the other part.

The foregoing embodiments are described only by using an example in which the device information is the current pixel aspect ratio. In some other possible implementations, when the device information is a computer device model or a screen model, the computer device may initialize the first field of view based on a correspondence between the computer device model and the first field of view value or a correspondence between the screen model and the first field of view value in the configuration file. This is not limited in this embodiment.

The computer device needs to adjust the first field of view for initialization of the virtual camera when the first-person shooting game is started. In addition, the first field of view may alternatively be adjusted during the game. For example, the user may adjust the second field of view of the second virtual camera according to requirements of the user, so that the computer device needs to adaptively adjust the first field of view based on the adjusted second field of view, to harmonize a picture proportion of the target virtual object and a picture proportion of another virtual object. The first field of view may be further adjusted when a model size of the virtual prop used by the first-person virtual object is excessively large.

Figure 10:
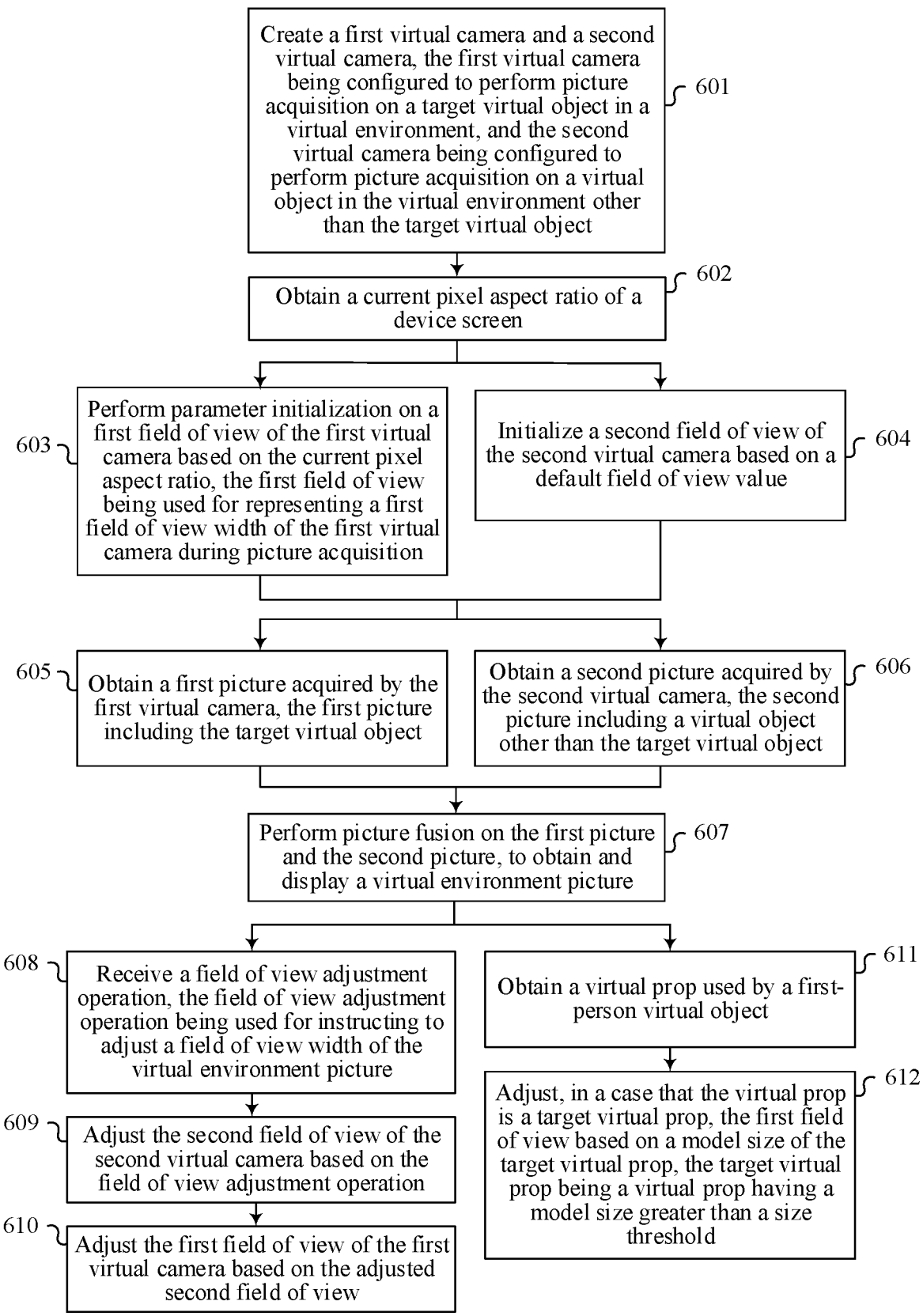
FIG. 10 is a flowchart of a method for displaying a virtual environment picture according to another exemplary embodiment of this disclosure.

In an exemplary implementation, referring to FIG. 10 based on FIG. 6, after step 607, the method for displaying a virtual environment picture further includes steps 608 to 612:

Step 608: Receive a field of view adjustment operation, the field of view adjustment operation being used for instructing to adjust a view field width of the virtual environment picture.

In an exemplary implementation, if the pixel aspect ratio of the current computer device is quite different from a standard pixel aspect ratio during picture design, or the pixel aspect ratio of the computer device changes (for example, for the computer device having a folded screen, pixel aspect ratios are different when the screen is unfolded and folded), the user may change the second field of view in a game setting interface of the first-person shooting game, so that a display ratio of the virtual environment other than the target virtual object may be adjusted.

For example, a second field of view value before adjustment is 55. The user adjusts the second field of view value to 57 in the game setting interface in a manner of digital input or dragging and sliding, and the computer device receives a field of view adjustment operation including the adjusted second field of view value.

Step 609: Adjust the second field of view of the second virtual camera based on the field of view adjustment operation.

The computer device updates the second field of view of the second virtual camera based on the second field of view value in the field of view adjustment operation. For example, if a value of the second field of view before adjustment is 55, and the user adjusts the second field of view value in the game setting interface to 57, the second field of view is correspondingly increased by the computer device.

Step 610: Adjust the first field of view of the first virtual camera based on the adjusted second field of view.

The second picture acquired by the second virtual camera does not include the target virtual object. Therefore, to harmonize the virtual environment picture, the computer device needs to correspondingly adjust the first field of view after adjusting the second field of view, to adapt the target virtual object to the current screen and the virtual environment. In an exemplary implementation, step 610 includes steps 1 to 3 as follows:

Step 1: Obtain a second configuration file, the second configuration file including correspondences between a candidate pixel aspect ratio, a candidate second field of view value, and a candidate first field of view value.

In an exemplary implementation, the second configuration file is downloaded when the first-person shooting game is downed in the computer device, and the first field of view is correspondingly adjusted by the computer device based on the adjusted the second configuration file after the second field of view is adjusted by the user. Since the first field of view is related to the pixel aspect ratio of the computer device and the adjusted second field of view, the second configuration file includes correspondences between a candidate pixel aspect ratio, a candidate second field of view value, and a candidate first field of view value. For example, a candidate pixel aspect ratio is 4:3, a candidate second field of view value is 57, and a corresponding candidate first field of view value is 60. For example, Table 3 shows some content of the second configuration file:

TABLE 3

| Candidate pixel aspect ratio | Candidate second field of view value | Candidate first field of view value |
|---|---|---|
| 1.33 | 57 | 60 |
| 1.33 | 60 | 62 |
| 1.77 | 57 | 57 |
| 1.77 | 53 | 53 |
| 2 | 52 | 47 |
| 2 | 50 | 45 |

Step 2: Obtain a target first field of view value from the second configuration file based on the current pixel aspect ratio and the adjusted second field of view.

For example, a current pixel aspect ratio is 4:3, and an adjusted second field of view is 57. If the computer device performs query in the second configuration file to obtain that a corresponding candidate first field of view value is 60, it is determined that a target first field of view value is 60.

Step 3: Adjust the first field of view based on the target first field of view value.

The computer device adjusts the first field of view of the first virtual camera based on the target first field of view value. For example, if a current pixel aspect ratio is 4:3, a first field of view value before adjustment is 58, and a target first field of view value is 60, the computer device correspondingly increases the first field of view of the first virtual camera, so that the proportion of the target virtual object is correspondingly decreased.

Step 611: Obtain the virtual prop used by the first-person virtual object.

To prevent the proportion of the target virtual object from being greatly changed and resulting in an inharmonious display picture of the target virtual object and another virtual object, the computer device usually adjusts the first field of view slightly based on the first configuration file. However, when a virtual prop (for example, a virtual gun of a relatively large model size) of a relatively large model size is used by the user, the virtual object may still be displayed incompletely or obscure the central field of view, and the first field of view may be further adjusted. In an exemplary implementation, the computer device obtains the virtual prop used by the first-person virtual character when a virtual prop switching operation of the first-person virtual character or a virtual prop equipment operation is detected.

Step 612: Adjust, in a case that the virtual prop is a target virtual prop, the first field of view based on a model size of the target virtual prop, the target virtual prop being a virtual prop having a model size greater than a size threshold.

In an exemplary implementation, the computer device stores the target virtual prop of which a first field of view requires to be adjusted and a correspondence between the model size of the target virtual prop and the first field of view. The first field of view is correspondingly increased based on the model size in a case that the virtual prop used by the first-person virtual character is the target virtual prop.

In an exemplary implementation, when the computer device detects that an operation of the first-person virtual character is to put away the target virtual prop or replace the target virtual prop with another non-target virtual prop, the first field of view is adjusted back to a first field of view after parameter initialization.

In this embodiment of this disclosure, the first field of view is correspondingly adjusted based on the second configuration file when the adjustment operation of the second field of view is received, to harmonize a proportion of the target virtual object and a proportion of the virtual object other than the target virtual object. For the virtual prop of a relatively large model size, the computer device further adjusts the first field of view based on the model size, to ensure that the central field of view of the first-person virtual character is obscured by the virtual prop.

Figure 11:
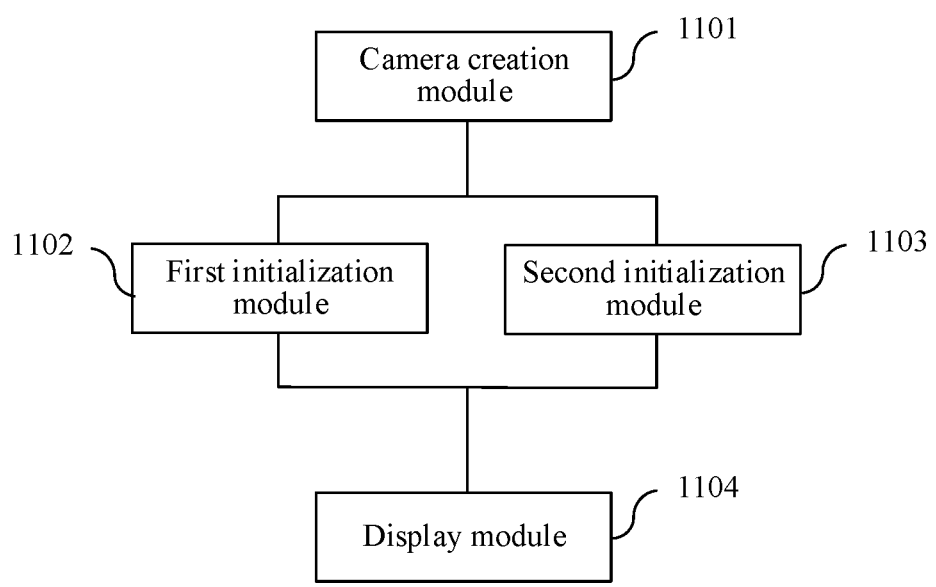
FIG. 11 is a structural block diagram of an apparatus for displaying a virtual environment picture according to an exemplary embodiment of this disclosure.

FIG. 11 is a structural block diagram of an apparatus for displaying a virtual environment picture according to an exemplary embodiment of this disclosure. The apparatus includes:

a camera creation module 1101, configured to create a first virtual camera and a second virtual camera, the first virtual camera being configured to perform picture acquisition on a target virtual object in a virtual environment, and the second virtual camera being configured to perform picture acquisition on a virtual object in the virtual environment other than the target virtual object, the target virtual object including a first-person virtual object and a virtual prop used by the first-person virtual object;

a first initialization module 1102, configured to perform parameter initialization on the first virtual camera based on device information, to adjust a proportion of the target virtual object in a virtual environment picture;

a second initialization module 1103, configured to perform parameter initialization on the second virtual camera; and a display module 1104, configured to display the virtual environment picture based on pictures acquired by the first virtual camera and the second virtual camera.

Exemplary, the first initialization module 1102 includes:

a first obtaining unit, configured to obtain a current pixel aspect ratio of a device screen; and a first initialization unit, configured to perform parameter initialization on a first field of view of the first virtual camera based on the current pixel aspect ratio, the first field of view being used for representing a first view field width of the first virtual camera during picture acquisition, the first view field width being in a positive correlation with the first field of view, and the first view field width being in a negative correlation with the proportion of the target virtual object in the virtual environment picture.

Exemplary, the first initialization unit is further configured to:

obtain a first configuration file, the first configuration file including a correspondence between a candidate pixel aspect ratio and a candidate first field of view value, the candidate first field of view value being in a negative correlation with the candidate pixel aspect ratio;

determine a target pixel aspect ratio in the first configuration file, a matching degree between the target pixel aspect ratio and the current pixel aspect ratio being higher than a matching degree between another candidate pixel aspect ratios in the configuration file and the current pixel aspect ratio; and initialize the first field of view based on the first field of view value corresponding to the target pixel aspect ratio.

Exemplary, the second initialization module 1103 includes:

a second initialization unit, configured to initialize a second field of view of the second virtual camera based on a default field of view value.

The apparatus further includes:

a receiving module, configured to receive a field of view adjustment operation, the field of view adjustment operation being used for instructing to adjust a view field width of the virtual environment picture;

a first adjustment module, configured to adjust the second field of view of the second virtual camera based on the field of view adjustment operation; and a second adjustment module, configured to adjust the first field of view of the first virtual camera based on the adjusted second field of view.

Exemplary, the second adjustment module includes:

a second obtaining unit, configured to obtain a second configuration file, the second configuration file including correspondences between a candidate pixel aspect ratio, a candidate second field of view value, and a candidate first field of view value;

a third obtaining unit, configured to obtain a target first field of view value from the second configuration file based on the current pixel aspect ratio and the adjusted second field of view; and a third adjustment unit, configured to adjust the first field of view based on the target first field of view value.

Exemplary, a first culling mask is set on the first virtual camera, and a second culling mask is set on the second virtual camera, a culling mask layer of the first culling mask being a layer corresponding to the target virtual object, and a culling mask layer of the second culling mask being a layer other than the layer corresponding to the target virtual object.

The display module 1104 includes:

a fourth obtaining unit, configured to obtain a first picture acquired by the first virtual camera, the first picture including the target virtual object;

a fifth obtaining unit, configured to obtain a second picture acquired by the second virtual camera, the second picture including a virtual object other than the target virtual object; and a picture fusion unit, configured to perform picture fusion on the first picture and the second picture, to obtain and display the virtual environment picture.

Exemplary, the apparatus further includes:

a first obtaining module, configured to obtain the virtual prop used by the first-person virtual object; and a third adjustment module, configured to adjust, in a case that the virtual prop is a target virtual prop, the first field of view based on a model size of the target virtual prop, the target virtual prop being a virtual prop having a model size greater than a size threshold.

Exemplary, the apparatus further includes:

a second obtaining module, configured to obtain a current first field of view value of the first field of view in a case that the first-person virtual object performs a preset action; and a value update module, configured to update the current first field of view value to the initialized first field of view value in a case that the current first field of view value is different from the initialized first field of view value.

Exemplary, positions of the first virtual camera and the second virtual camera in the virtual environment are the same.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 12:
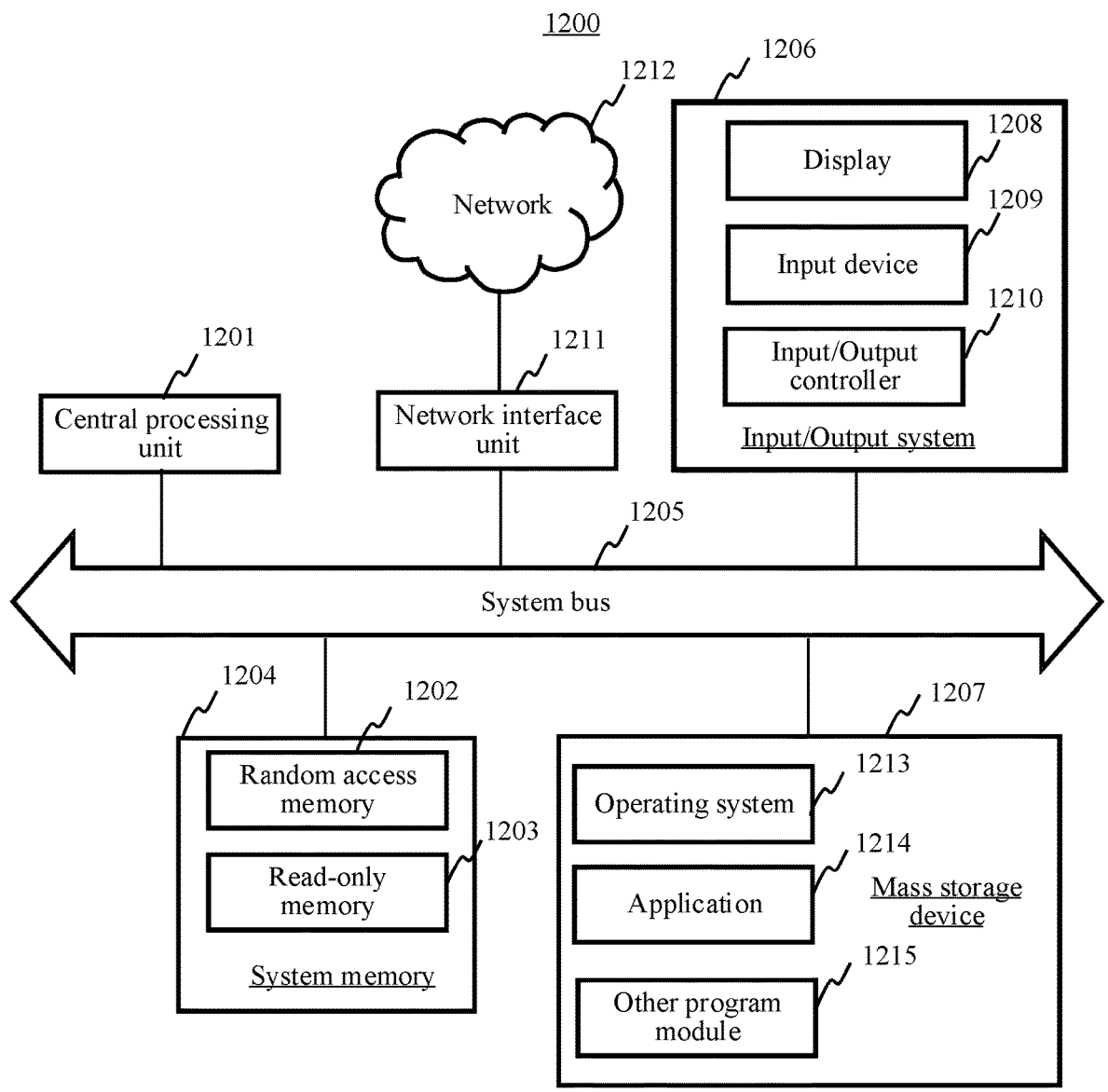
FIG. 12 is a structural block diagram of a computer device according to an exemplary embodiment of this disclosure.

FIG. 12 is a schematic structural diagram of a computer device according to an embodiment of this disclosure. Specifically, The computer device 1200 includes a central processing unit (CPU) 1201, a system memory 1204 including a random access memory (RAM) 1202 and a read-only memory (ROM) 1203, and a system bus 1205 connecting the system memory 1204 to the CPU 1201. The computer device 1200 further includes a basic input/output (I/O) controller 1206 assisting in transmitting information between components in a computer, and a mass storage device 1207 configured to store an operating system 1213, an application 1214, and another program module 1215.

The basic I/O system 1206 includes a display 1208 configured to display information, and an input device 1209 used by a user to input information, such as a mouse or a keyboard. The display 1208 and the input device 1209 are both connected to the CPU 1201 by using an input/output controller 1210 connected to the system bus 1205. The basic I/O system 1206 may further include the input/output controller 1210, to receive and process inputs from a plurality of other devices, such as the keyboard, the mouse, or an electronic stylus. Similarly, the I/O controller 1210 further provides an output to a display screen, a printer, or another type of output device.

The mass storage device 1207 is connected to the CPU 1201 by using a large-capacity storage controller (not shown) connected to the system bus 1205. The mass storage device 1207 and an associated computer-readable medium provide non-volatile storage for the computer device 1200. That is, the mass storage device 1207 may include a computer-readable medium (not shown) such as a hard disk or a compact disc ROM (CD-ROM) drive.

Without loss of generality, the computer readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), a flash memory or another solid-state storage technology, a CD-ROM, a digital versatile disc (DVD) or another optical storage, a magnetic cassette, a magnetic tape, or a magnetic disk storage or another magnetic storage device. Certainly, a person skilled in the art may learn that the computer storage medium is not limited to the foregoing types. The system memory 1204 and the mass storage device 1207 may be collectively referred to as a memory.

According to the various embodiments of this disclosure, the computer device 1200 may further be connected, through a network such as the Internet, to a remote computer on the network for running. That is, the computer device 1200 may be connected to a network 1212 by using a network interface unit 1211 connected to the system bus 1205, or may be connected to another type of network or a remote computer system (not shown) by using a network interface unit 1211.

The memory further includes at least one instruction, at least one program, a code set, or an instruction set. The at least one instruction, the at least one program, the code set, or the instruction set is stored in the memory and is configured to be executed by one or more processors to implement the foregoing method for displaying a virtual environment picture.

In an exemplary embodiment, a non-temporary computer-readable storage medium including an instruction is further provided. For example, the non-temporary computer-readable storage medium includes at least one instruction, at least one program, a code set, or an instruction set. The at least one instruction, the at least one program, the code set, or the instruction set may be executed by a processor to implement all or some steps of the method shown according to the corresponding embodiment in FIG. 3, FIG. 5, or FIG. 9. For example, the non-temporary computer-readable storage medium may be a read-only memory (ROM), a random-access memory (RAM), a compact disc read-only memory (CD-ROM), a magnetic tape, a floppy disk, an optical data storage device, and the like.

This disclosure further provides a computer program product or a computer program. The computer program product or the computer program includes computer instructions, the computer instructions being stored in a computer-readable storage medium. A processor of a computer device reads the computer instructions from the computer-readable storage medium, and executes the computer instructions, to cause the computer device to perform the method for displaying a virtual environment picture provided in the various optional implementations in the foregoing aspects.

Other embodiments of this disclosure will be apparent to a person skilled in the art from consideration of the specification and practice of the disclosure here. This disclosure is intended to cover any variations, uses or adaptive changes of this disclosure. Such variations, uses or adaptive changes follow the general principles of this disclosure, and include well-known knowledge and conventional technical means in the art that are not disclosed in this disclosure. The specification and the embodiments are considered as merely exemplary, and the scope and spirit of this disclosure are pointed out in the following claims.

It is to be understood that this disclosure is not limited to the precise structures described above and shown in the accompanying drawings, and various modifications and changes can be made without departing from the scope of this disclosure. The scope of this disclosure is subject only to the appended claims.

What is claimed is:

1. A method for displaying a virtual environment picture, applicable to a computer device, the method comprising:
creating a first virtual camera and a second virtual camera, the first virtual camera being configured to perform picture acquisition of a target virtual object from the target virtual object in a virtual environment, the second virtual camera being configured to perform picture acquisition of a virtual object other than the target virtual object from the target virtual object in the virtual environment, and the target virtual object comprising a first-person virtual object and a virtual prop used by the first-person virtual object;
performing parameter initialization on the first virtual camera based on device information of the computer device to adjust a proportion of the target virtual object in a virtual environment picture;
performing parameter initialization on the second virtual camera; and
displaying the virtual environment picture based on pictures acquired by the first virtual camera and the second virtual camera.

2. The method according to claim 1, wherein performing parameter initialization on the first virtual camera based on device information comprises:
obtaining a current pixel aspect ratio of a device screen; and
performing parameter initialization on a first field of view of the first virtual camera based on the current pixel aspect ratio, the first field of view representing a first view field width of the first virtual camera during the picture acquisition of the target virtual object, the first view field width being in a positive correlation with the first field of view, and the first view field width being in a negative correlation with the proportion of the target virtual object in the virtual environment picture.

3. The method according to claim 2, wherein performing the parameter initialization on the first field of view of the first virtual camera based on the current pixel aspect ratio comprises:
obtaining a first configuration file, the first configuration file comprising a correspondence between a candidate pixel aspect ratio and a candidate first field of view value, the candidate first field of view value being in a negative correlation with the candidate pixel aspect ratio;
determining a target pixel aspect ratio in the first configuration file, a matching degree between the target pixel aspect ratio and the current pixel aspect ratio being higher than a matching degree between another candidate pixel aspect ratios in the configuration file and the current pixel aspect ratio; and
initializing the first field of view based on the first field of view value corresponding to the target pixel aspect ratio.

4. The method according to claim 2, wherein performing the parameter initialization on the second virtual camera comprises:
initializing a second field of view of the second virtual camera based on a default field of view value; and
after displaying the virtual environment picture based on pictures acquired by the first virtual camera and the second virtual camera, the method further comprises:
receiving information about a field of view adjustment operation, the field of view adjustment operation being used for instructing to adjust a view field width of the virtual environment picture;
adjusting the second field of view of the second virtual camera based on the field of view adjustment operation; and
adjusting the first field of view of the first virtual camera based on the adjusted second field of view.

5. The method according to claim 4, wherein adjusting the first field of view of the first virtual camera based on the adjusted second field of view comprises:
obtaining a second configuration file, the second configuration file comprising correspondences between a candidate pixel aspect ratio, a candidate second field of view value, and a candidate first field of view value;
obtaining a target first field of view value from the second configuration file based on the current pixel aspect ratio and the adjusted second field of view; and
adjusting the first field of view based on the target first field of view value.

6. The method according to claim 1, wherein a first culling mask is set on the first virtual camera, and a second culling mask is set on the second virtual camera, a culling mask layer of the first culling mask being a layer corresponding to the target virtual object, and a culling mask layer of the second culling mask being a layer other than the layer corresponding to the target virtual object; and
   displaying the virtual environment picture based on the pictures acquired by the first virtual camera and the second virtual camera comprises:
   obtaining a first picture acquired by the first virtual camera, the first picture comprising the target virtual object;
   obtaining a second picture acquired by the second virtual camera, the second picture comprising a virtual object other than the target virtual object; and
   performing picture fusion on the first picture and the second picture to obtain and display the virtual environment picture.

7. The method according to claim 1, further comprising:
   obtaining the virtual prop used by the first-person virtual object; and
   adjusting, when the virtual prop is a target virtual prop, the first field of view based on a model size of the target virtual prop, the target virtual prop being a virtual prop having a model size greater than a size threshold.

8. The method according to claim 1, wherein after displaying the virtual environment picture based on the pictures acquired by the first virtual camera and the second virtual camera, the method further comprises:
   obtaining a current first field of view value of the first field of view when the first-person virtual object performs a preset action; and
   updating the current first field of view value to an initialized first field of view value when the current first field of view value is different from the initialized first field of view value.

9. The method according to claim 1, wherein positions of the first virtual camera and the second virtual camera in the virtual environment are the same.

10. A computer device, comprising a processor and a memory, the memory storing at least one instruction, the at least one instruction being loaded and executed by the processor to perform steps comprising:
   creating a first virtual camera and a second virtual camera, the first virtual camera being configured to perform picture acquisition of a target virtual object from the target virtual object in a virtual environment, the second virtual camera being configured to perform picture acquisition of a virtual object other than the target virtual object in the virtual environment, and the target virtual object comprising a first-person virtual object and a virtual prop used by the first-person virtual object;
   performing parameter initialization on the first virtual camera based on device information of the computer device to adjust a proportion of the target virtual object in a virtual environment picture;
   performing parameter initialization on the second virtual camera; and
   displaying the virtual environment picture based on pictures acquired by the first virtual camera and the second virtual camera.

11. The computer device of claim 10, wherein the at least one instruction is loaded and executed by the processor to performing parameter initialization on the first virtual camera based on device information by:
   obtaining a current pixel aspect ratio of a device screen; and
   performing parameter initialization on a first field of view of the first virtual camera based on the current pixel aspect ratio, the first field of view representing a first view field width of the first virtual camera during the picture acquisition of the target virtual object,
   the first view field width being in a positive correlation with the first field of view, and the first view field width being in a negative correlation with the proportion of the target virtual object in the virtual environment picture.

12. The method according to claim 11, wherein the at least one instruction is loaded and executed by the processor to performing the parameter initialization on the first field of view of the first virtual camera based on the current pixel aspect ratio by:
   obtaining a first configuration file, the first configuration file comprising a correspondence between a candidate pixel aspect ratio and a candidate first field of view value, the candidate first field of view value being in a negative correlation with the candidate pixel aspect ratio;
   determining a target pixel aspect ratio in the first configuration file, a matching degree between the target pixel aspect ratio and the current pixel aspect ratio being higher than a matching degree between another candidate pixel aspect ratios in the configuration file and the current pixel aspect ratio; and
   initializing the first field of view based on the first field of view value corresponding to the target pixel aspect ratio.

13. The method according to claim 11, wherein the at least one instruction is loaded and executed by the processor to performing the parameter initialization on the second virtual camera by: initializing a second field of view of the second virtual camera based on a default field of view value; and
   after displaying the virtual environment picture based on pictures acquired by the first virtual camera and the second virtual camera, the at least one instruction is further loaded and executed by the processor to:
   receiving information about a field of view adjustment operation, the field of view adjustment operation being used for instructing to adjust a view field width of the virtual environment picture;
   adjusting the second field of view of the second virtual camera based on the field of view adjustment operation; and
   adjusting the first field of view of the first virtual camera based on the adjusted second field of view.

14. The method according to claim 13, wherein the at least one instruction is loaded and executed by the processor to adjusting the first field of view of the first virtual camera based on the adjusted second field of view by:
   obtaining a second configuration file, the second configuration file comprising correspondences between a candidate pixel aspect ratio, a candidate second field of view value, and a candidate first field of view value;
   obtaining a target first field of view value from the second configuration file based on the current pixel aspect ratio and the adjusted second field of view; and
   adjusting the first field of view based on the target first field of view value.

15. The method according to claim 10, wherein a first culling mask is set on the first virtual camera, and a second culling mask is set on the second virtual camera, a culling mask layer of the first culling mask being a layer corresponding to the target virtual object, and a culling mask layer of the second culling mask being a layer other than the layer corresponding to the target virtual object; and
   the at least one instruction is loaded and executed by the processor to displaying the virtual environment picture based on the pictures acquired by the first virtual camera and the second virtual camera by:
obtaining a first picture acquired by the first virtual camera, the first picture comprising the target virtual object;
obtaining a second picture acquired by the second virtual camera, the second picture comprising a virtual object other than the target virtual object; and
performing picture fusion on the first picture and the second picture to obtain and display the virtual environment picture.

16. The method according to claim 10, wherein the at least one instruction is further loaded and executed by the processor to:
obtaining the virtual prop used by the first-person virtual object; and
adjusting, when the virtual prop is a target virtual prop, the first field of view based on a model size of the target virtual prop, the target virtual prop being a virtual prop having a model size greater than a size threshold.

17. The method according to claim 10, wherein after displaying the virtual environment picture based on the pictures acquired by the first virtual camera and the second virtual camera, the at least one instruction is further loaded and executed by the processor to:
obtaining a current first field of view value of the first field of view when the first-person virtual object performs a preset action; and
updating the current first field of view value to an initialized first field of view value when the current first field of view value is different from the initialized first field of view value.

18. The method according to claim 10, wherein positions of the first virtual camera and the second virtual camera in the virtual environment are the same.

19. A non-transitory computer-readable storage medium, storing at least one instruction, the at least one instruction being loaded and executed by a processor to perform steps comprising:
creating a first virtual camera and a second virtual camera, the first virtual camera being configured to perform picture acquisition of a target virtual object in a virtual environment, the second virtual camera being configured to perform picture acquisition of a virtual object other than the target virtual object in the virtual environment, and the target virtual object comprising a first-person virtual object and a virtual prop used by the first-person virtual object;
performing parameter initialization on the first virtual camera based on device information to adjust a proportion of the target virtual object in a virtual environment picture;
performing parameter initialization on the second virtual camera; and
displaying the virtual environment picture based on pictures acquired by the first virtual camera and the second virtual camera.

20. The non-transitory computer-readable storage medium of claim 19, wherein the at least one instruction is loaded and executed by the processor to performing parameter initialization on the first virtual camera based on device information by:
obtaining a current pixel aspect ratio of a device screen; and
performing parameter initialization on a first field of view of the first virtual camera based on the current pixel aspect ratio, the first field of view representing a first view field width of the first virtual camera during the picture acquisition of the target virtual object,
the first view field width being in a positive correlation with the first field of view, and the first view field width being in a negative correlation with the proportion of the target virtual object in the virtual environment picture.

* * * * *